United States Patent
Hugli et al.

[15] 3,651,353
[45] Mar. 21, 1972

[54] PIEZOELECTRIC PRESSURE TRANSDUCER WITH ACCELERATION COMPENSATION

[72] Inventors: Hans W. Hugli, Buffalo; Vernon H. Siegel, Clarence, both of N.Y.

[73] Assignee: Sundstrand Data Control, Inc., Redmond, Wash.

[22] Filed: Oct. 13, 1969

[21] Appl. No.: 865,651

[52] U.S. Cl. ................ 310/8.4, 179/110 A, 310/8.2, 310/8.7, 310/8.9
[51] Int. Cl. .......................................... H04r 17/00
[58] Field of Search .............. 310/8.9, 8.8, 8.4, 8.2, 8.3, 310/9.1, 9.4; 179/110 A

[56] References Cited

UNITED STATES PATENTS

| | | | |
|---|---|---|---|
| 2,507,636 | 5/1950 | Kistler | 310/8.7 X |
| 2,808,522 | 10/1957 | Dranetz | 310/8.4 X |
| 2,849,629 | 8/1958 | Kissinger | 310/8.4 |
| 3,104,336 | 9/1963 | Harris | 310/8.8 |
| 3,150,274 | 9/1964 | Pischinger | 310/8.9 |
| 3,311,873 | 3/1967 | Schloss | 310/8.4 X |
| 3,348,076 | 10/1967 | Gerber | 310/8.4 |
| 3,349,259 | 10/1967 | Kistler | 310/8.4 X |
| 3,374,663 | 3/1968 | Morris | 310/8.4 X |
| 3,424,930 | 1/1969 | List et al. | 310/8.8 X |

Primary Examiner—William M. Shoop, Jr.
Assistant Examiner—Mark O. Budd
Attorney—Le Blanc & Shur

[57] ABSTRACT

Disclosed is a microphone in the form of a piezoelectric pressure transducer for detecting high intensity noise. The microphone incorporates a lightweight endpiece, preferably of beryllium metal, having a cavity for receiving an acceleration compensation weight. A preloading sleeve is attached at one end to a support while its other end is slipped over a portion of the endpiece and secured by a retaining ring. The microphone is provided with a separate compartment for housing an electric circuit receiving the output from the preloaded quartz crystals of the transducer.

2 Claims, 5 Drawing Figures

INVENTORS
HANS W. HUGLI
VERNON H. SIEGEL
BY
*Le Blanc & Shur*
ATTORNEYS

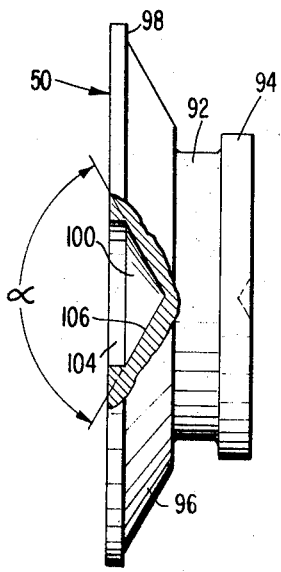
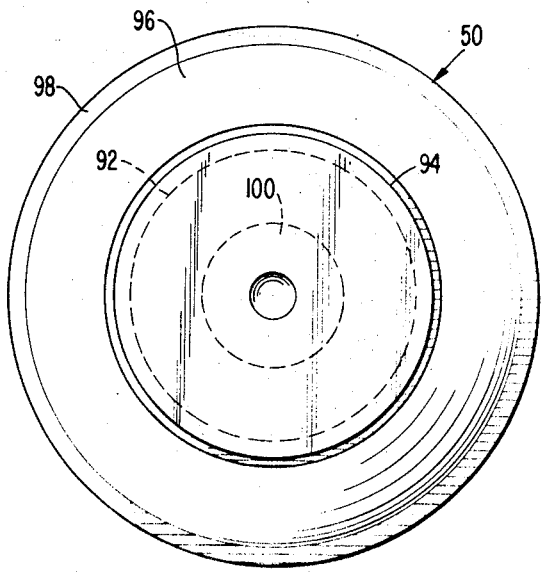
FIG. 3   FIG. 4
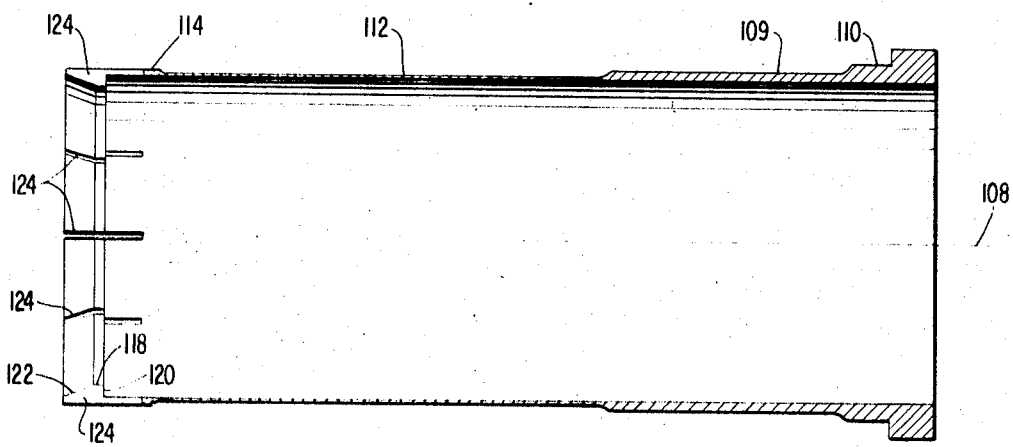
FIG. 5
INVENTORS.
HANS W. HUGLI
VERNON H. SIEGEL
BY
*Le Blanc & Shur*
ATTORNEYS

PIEZOELECTRIC PRESSURE TRANSDUCER WITH ACCELERATION COMPENSATION

This invention relates to microphones and more particularly to a rugged and yet highly sensitive piezoelectric pressure transducer for sensing very low pressure levels. Important features of the invention include an improved arrangement and method of assembly for compensating the pressure transducer for the adverse effects of acceleration forces.

Diaphragm type pressure transducers in the form of microphones for sensing the relatively small pressures created by sound waves are well known. However, increased interest in the detection and measurement of high intensity sound levels has led to the requirement for a more rugged microphone capable of withstanding the severe environment usually accompanying a high level noise field. Prior microphone constructions have lacked the combination of ruggedness and sensitivity necessary to measure high intensity noise such as is given off by a rocket engine, often accompanied by excessive temperature and by acceleration forces.

The present invention overcomes this difficulty by providing a very rugged and yet sensitive pressure transducer or microphone particularly adapted for measuring high intensity noise such as that generated by rocket engines. While described in conjunction with use for measuring rocket engine noise, it is understood that the microphone of the present invention is adapted for use wherever a rugged and yet highly sensitive pressure transducer is desired. The microphone also finds particular application in acoustic chambers where it has become customary to subject electronic circuits usable in space and other applications to high intensity noise in order to detect any damage to the circuit from high noise levels.

In the present invention, the microphone takes the form of a quartz crystal module connected to a flexible metal diaphragm for sensing low pressure levels up to about 1 pound per square inch. Forming a part of the crystal module are two sets of quartz crystal wafers, the first or larger set provided to detect pressure forces applied to the diaphragm and the second or smaller set is used to compensate for acceleration forces applied along the sensitive axis of the transducer. Surrounding the crystal wafers is a preloading sleeve for applying a preload or compression force to the crystals so that their electrical output accurately follows the deflection forces applied to the pressure diaphragm.

Important features of the present invention include the incorporation in the quartz crystal module of an enlarged lightweight endpiece in the form of what is in effect an adjustable mass for making an accurate final adjustment in the acceleration compensation output of the transducer. The endpiece is provided with a central hole or cavity to which may be added a suitable size mass to insure highly accurate acceleration compensation. The endpiece is preferably secured by solder or the like to the diaphragm to prevent low frequency diaphragm resonances and the end of the preloading sleeve is connected to the module endpiece in a novel and efficient manner. Finally, the complete module is assembled in a hermetically sealed casing, preferably provided with a compartment for an internally contained electronic circuit to provide a low impedance output for connection through a conventional coaxial cable to remote monitors.

It is, therefore, one object of the present invention to provide an improved microphone particularly suited for detecting high intensity noise such as that generated by a modern rocket engine.

Another object of the present invention is to provide a rugged pressure transducer having increased sensitivity.

Another object of the present invention is to provide a diaphragm type pressure transducer having improved acceleration compensation so that the output of the transducer is substantially insensitive to acceleration forces along its pressure sensitive axis.

Another object of the present invention is to provide an improved quartz crystal pressure transducer incorporating a novel ceramic or beryllium metal endpiece to which is joined a preloading sleeve.

Another object of the present invention is to provide an improved microphone provided with a chamber for incorporating within the hermetically sealed jacket of the microphone an internal electronic circuit.

These and further objects and advantages of the invention will be more apparent upon reference to the following specification, claims, and appended drawings, wherein:

FIG. 3 is an enlarged view of the endpiece of the microphone of FIGS. 1 and 2 with its center broken away to show the cavity for receiving an acceleration compensation weight or mass;

FIG. 4 is an end view of the module endpiece of FIG. 3; and

FIG. 5 is a side sectional view of the preloading sleeve of FIGS. 1 and 2.

Figure 1:
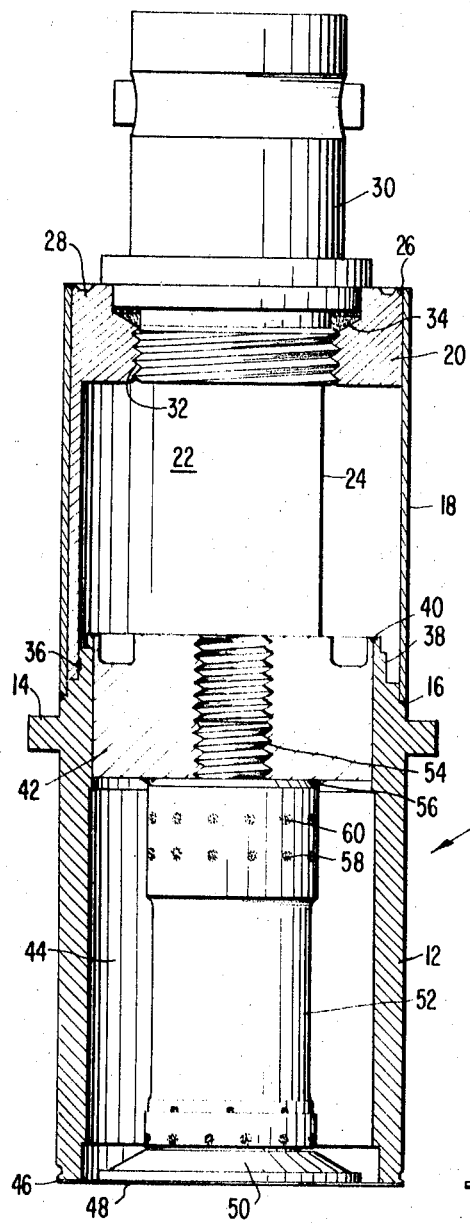
FIG. 1 is a vertical view with parts in section showing the overall microphone constructed in accordance with the present invention.

Referring to the drawings, the novel pressure transducer or microphone of the present invention is generally indicated at 10 in FIG. 1 and comprises a housing or jacket 12 including an annular mounting flange 14. Attached to the upper end of jacket 12 by heli-arc welding as at 16 is a sleeve 18 which also forms a part of the transducer housing. Sleeve 18 surrounds a transducer base, generally indicated at 20, which defines a chamber 22 adapted to house an electronic circuit (not shown) including one or more transistors, which circuit, by way of example, may be of the type shown and described in assignee's copending application Ser. No. 746,700, filed July 9, 1968. One side of the base 20 is cut away as at 24 to provide an access window during assembly so that the electronic circuit in chamber 22 may be adjusted. This window is subsequently covered over by the sleeve 18 which is arc welded not only to jacket 12 but also to base 20 as indicated at 26 to provide a hermetic seal for the electronic components in chamber 22. Finally, mounted in the end 28 of base 20 is a conventional coaxial connector 30 for supplying an output electrical signal from the microphone 10 to a conventional cable connected to remote monitoring equipment. Connector 30 is preferably threaded into the base as indicated at 32 and secured by epoxy at 34.

The other end of base 28 is spot welded at 36 to reduced diameter end 38 of jacket 12. The jacket is also heli-arc welded for a hermetic seal as indicated at 40 to the upper end of a divider 42 on which is mounted a piezoelectric transducer module generally indicated at 44. Arc welded, as at 46, to the lower end of jacket 12 is a flexible metal and preferably stainless steel diaphragm 48 having a central hole 49. The diaphragm bears against and is preferably attached to a module endpiece 50. Endpiece 50 is, in turn, secured to a module preloading sleeve 52 and the upper end of the module preloading sleeve 52 is threaded as at 54 into divider 42 and secured by epoxy both in the threads 54 and circumferentially of the module as indicated at 56.

Figure 2:
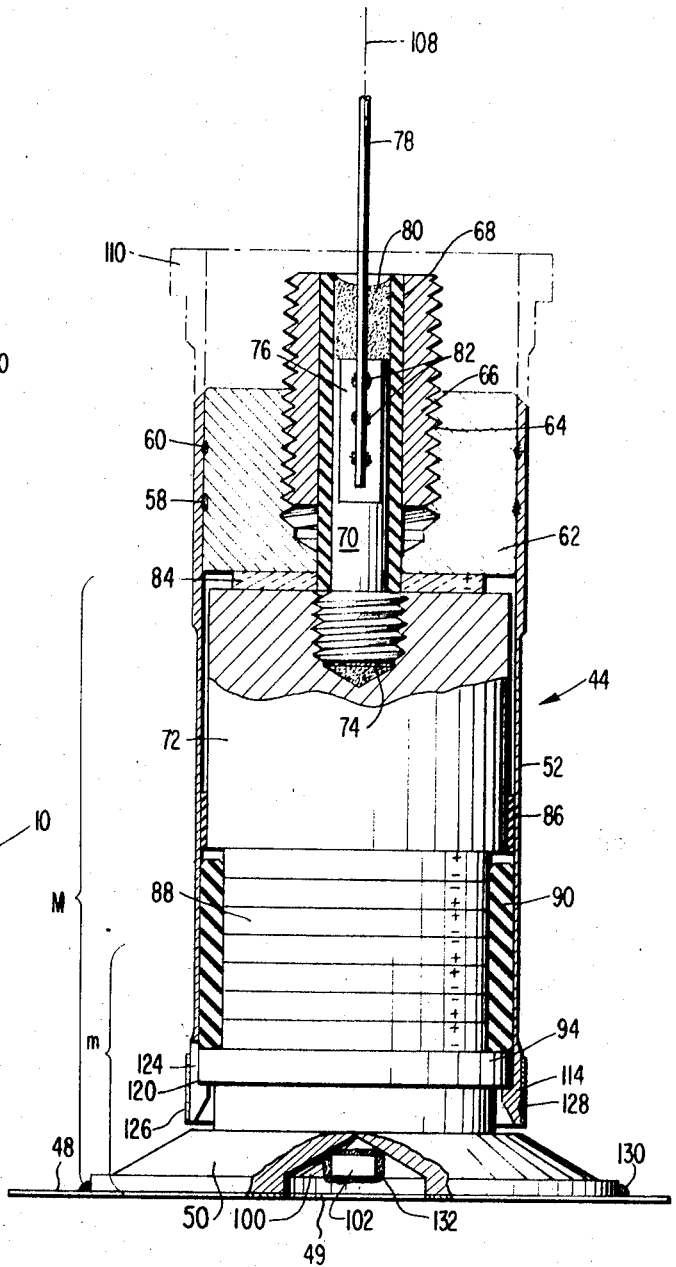
FIG. 2 is a vertical view with parts in section of the piezoelectric module incorporated in the microphone transducer of FIG. 1.

FIG. 2 is a cross sectional view through parts of the module 44 of FIG. 1. The module comprises the preloading sleeve 52 which is connected by two pairs of circumferentially spaced spot welds 58 and 60 to a module base 62. Each series of spot welds is preferably 12 in number equally spaced about the circumference of base 62. Threaded into the module base 62 and secured by epoxy at 64 is a retainer sleeve 66 in which is mounted an electrically insulating sleeve 68. Positioned within sleeve 68 is a contact pin 70 which has its head threaded into a seismic mass 72 and is secured to it by epoxy 74. Pin 70 is in electrical contact with the seismic mass 72 and is provided at its other end with a flat 76 to which is attached one end of an electrical lead 78 secured within insulating sleeve 68 by epoxy as at 80. Lead 78 is soldered or otherwise electrically connected to the flat on pin 70 as indicated at 82.

Seismic mass 72 is preferably made of relatively heavy material, such as tungsten, and retained between it and the module base 62 is a piezoelectric quartz crystal 84 which provides acceleration compensation for the transducer in a manner more fully described below. Tungsten mass 72 is spaced from prestressing sleeve 52 by an electrically insulating ring 86 and bears at its other end on a stack of piezoelectric quartz crystals, generally indicated at 88, in turn spaced form preloading sleeve by a larger electrically insulating ring 90. Bearing against the other end of crystal stack 88 is a lightweight endpiece 50 shown in more detail in FIGS. 3 and 4.

Endpiece 50 is formed of a ceramic material or preferably from a beryllium metal which is obtained from a vacuum hot pressed powder. The endpiece comprises a center tubular section 92, an upper flange 94, and a lower outwardly flaring skirt 96 terminating in lower flange 98. Endpiece 50 is solid except that its lower end has its center drilled out to form the cavity 100 to receive an acceleration compensating weight 102 illustrated in FIG. 2. By way of example only, the diameter of the lower flange 98 of endpiece 50 may be approximately 0.468 inch, the diameter of tubular section 92 may be 0.250 inch, and the diameter of upper flange 94 may be 0.280 inch. Cavity 100 is drilled out at 104 in FIG. 3 and terminates in a conical surface 106 forming an angle alpha of approximately 120°. Skirt 96 preferably flares outwardly away from the sensitive axis 108 of the microphone at an angle of 60°.

FIG. 5 is a cross section through the preloading sleeve 52 provided with a thickened end 109 for spot welding to the base 62 and a flange 110 for applying preloading stresses to the sleeve during assembly, which flange is later trimmed away as indicated by the dashed lines in FIG. 2. The central portion 112 of the preloading sleeve is of reduced thickness, for example, 0.005 inch, and terminates at its other end in a thickened annular retainer 114. Retainer 114 is of thickened cross section and includes a portion 118 of reduced diameter forming a retaining shoulder 120 and an outwardly flaring tapered section 122. The retainer is provided with a plurality of circumferentially spaced slots 124 which extend through the major portion of the retainer 114 but terminate short of the reduced thickness central section 112 of the preloading sleeve. The slots extend radially of the sensitive axis 108 and are equally spaced circumferentially about the preloading sleeve. While any suitable number of slots may be provided, in the preferred embodiment the retaining end of the preloading sleeve is provided with eight equally spaced slots 124.

Referring to FIG. 2, the slots 124 permit the flexible material of the sleeve 52, which is preferably of stainless steel, to be slightly expanded so that the retainer 114 slips over flange 94 of the endpiece and then snaps inwardly so that the shoulders 120 engage and retain the lower side of flange 94. Slipped over the preloading sleeve 52 is a stainless steel ring 126 which is spot welded to sleeve 52 by eight equally spaced spot welds, as indicated at 128. Finally, diaphragm 48 is preferably soldered to endpiece 50 by silver solder, as indicated at 130.

During assembly, the endpiece is first slipped into the retainer end of the stainless steel sleeve by spreading the sections of retainer 114 formed by slots 124. The retainer is tapered as at 122 in FIG. 5 to permit the endpiece to be slid into the preloading sleeve until the shoulders 120 snap over the edge of endpiece flange 94. Ring 126, which was previously placed over the preloading sleeve, is slid into place and spot welded to retainer 114 of the preloading sleeve. The module, including the two sets 84 and 88 of piezoelectric wafers, is then slid into the upper dashed line end of the preloading sleeve in FIG. 2. Preferably a preloading force of approximately 100 pounds is applied and with this force applied the preloading sleeve is welded as at 58 and 60 to the module base 62 so that the quartz crystals are tightly clamped between this base and endpiece 50. Once the preloading sleeve is welded to the base and endpiece, the upper flange portion 110 of the preloading sleeve is trimmed away as indicated by dashed lines in FIG. 2. The module is then incorporated into the casing 12 and sleeve 18 of FIG. 1 and the diaphragm is attached.

An important feature of the present invention is that the complete microphone may be subjected to a final test for acceleration compensation after the diaphragm 48 is secured to the jacket 12 and endpiece 50. That is, the unit is subjected to conventional tests and if acceleration errors are detected, they are adjusted for by inserting into the cavity 100 of the endpiece an additional weight 102. The weight may be of any suitable size and weight and if a heavy weight is desired, tungsten may be utilized. However, in conventional practice, a short section of stainless steel wire is cut to the necessary length to form the added weight 102 and this wire is surrounded by a layer of epoxy 132 which firmly holds it in place within cavity 100.

More particularly, the electrical signal output from the crystal stack 88 due to acceleration forces along the sensitive axis 108 is cancelled out by the electrical output of the compensating crystal 84 which is electrically connected in opposition to the crystals in stack 88. This compensation is of the type described in assignee's U.S. Pat. No. 3,349,259 and the output from the crystals in stack 88 is developed on gold or silver discs placed between the crystals. These discs act as electrodes and are connected together by turned-over tabs (not shown). One side of the output of the crystals in both stacks is by way of the electrodes to the tungsten mass 72 and though pin 70 to output lead 78. The other side of the electrical output is connected through opposite electrodes, the preloading sleeve 52 and module base 62 to the grounded housing of the transducer in FIG. 1 and to the outer conductor of coaxial connector 30, likewise conventionally grounded. It is understood that lead 78 is connected to the electronics in chamber 22 and the output of the electronic circuit is applied between the grounded case and the inner conductor of coaxial connector 30 in a conventional manner.

The total acceleration force acting upon the piezoelectric crystal 84 is proportional to the mass of the lower end of the module including seismic mass 72, the quartz crystals 88, the endpiece 50, and related structures. This total mass is indicated by the mass M in FIG. 2. The acceleration force acting on the crystals in stack 88 is substantially less and is proportional to the mass of half the crystal stack 88 and endpiece 50 along with associated structures. This mass is indicated at $m$ in FIG. 2. Assuming that each of the crystals in set 84 and set 88 produce equal outputs, since there are seven crystals in stack 88 and only one in stack 84, the mass M is chosen to be approximately 7 times the mass $m$. Since crystal stack 84 is connected in opposition to the seven crystals in stack 88, the larger mass, including the heavy tungsten element 72, produces a seven-fold output in crystal 84 for acceleration forces along axis 108 which is equal and opposite to the output from the crystal stack 88 due to the same acceleration force. However, for pressure forces acting on diaphragm 48, the ratio of the two masses is of no consequence since the output from each crystal is the same magnitude if the crystals are of equal size and design. Thus, the pressure response of the microphone is such that crystal 84 cancels out only one of the seven crystals in stack 88 and the output signal on lead 78 in response to pressure forces is the sum of the output from six of the crystals in stack 88.

The microphone 10 is initially assembled so that the crystal 84 slightly overcompensates for acceleration forces. Final adjustment of the compensation is made by adding an appropriate size mass 102 to the cavity 100 of the endpiece 50 after diaphragm 48 is put in place. In this way, any variations because of stresses or strains or other misalignment in the transducer may be compensated for by the addition of weight 102. The weight 102, when put in place, contributes to both masses M and m but, as previously mentioned, since mass $m$ is approximately one-seventh of mass M, the addition of weight 102 increases the acceleration responsive output of the stack 88 approximately seven times more than it increases the acceleration responsive output of the crystal 84. For this reason, by proper selection of the size of the added mass 102, almost perfect acceleration compensation can be achieved for the microphone 10. Once the proper weight has been chosen, it is inserted through hole 49 in the diaphragm and secured in place by the epoxy 132.

It is apparent from the above that the present invention provides an improved piezoelectric transducer and particularly one having increased sensitivity while at the same time evidencing sufficient ruggedness to withstand very severe environments. It is particularly suited for measuring high intensity sound waves resulting from noise created by rocket engines and as conventionally generated in acoustic chambers during the testing of electronic equipment. Important features of the invention include the adjustment of acceleration compensation by adding a mass in a center hole of the beryllium metal or ceramic endpiece. In addition, the diaphragm is soldered to the endpiece to prevent diaphragm resonances. Connection between the stainless steel preloading sleeve and the beryllium metal or ceramic endpiece which cannot be effected by welding due to the nature of the materials is provided for in the present invention by a novel slotted retainer portion on the end of the sleeve which expands to slip over a cooperating flange on the endpiece 50. Finally, the transducer of the present invention incorporates an integral compartment adapted to house an electronic circuit including active elements such as one or more transistors which may be used to impedance convert the output of the piezoelectric crystals for connection to remote monitoring equipment through a conventional two-wire coaxial cable. Connection to the electronic circuitry from the crystals is by way of a relatively short direct wire 78 so as to prevent capacitive changes and sensitivity changes which might otherwise result from wire movement.

What is claimed and desired to be secured by United States Letters Patent is:

1. A piezoelectric pressure transducer comprising first and second piezoelectric sets each including at least one quartz crystal wafer, said first set having a lesser number of wafers whereby it produces a smaller electrical output signal than said second set for a given force, said sets being poled such that their outputs oppose each other, a seismic mass between said piezoelectric sets, a support adjacent said first set and an endpiece adjacent said second set, said endpiece being made of beryllium metal, a stainless steel preloading sleeve surrounding said wafers and acting to urge said endpiece toward said support to preload said sets, and a flexible stainless steel diaphragm having a central hole secured to said endpiece, said endpiece including an adjustment weight adhesively secured to it whereby the total seismic mass acting on said sets is inversely proportional to their electrical outputs for a given force, said endpiece including an annular flange on the side remote from said diaphragm, said preloading sleeve including an internal shoulder and a plurality of circumferentially spaced elongated slots whereby said sleeve may be expanded to slip over said endpiece so that said shoulder engages said flange.

2. A pressure transducer according to claim 1 including a stainless steel retaining ring welded to said preloading sleeve and overlying said slots.

* * * * *